United States Patent Office 3,721,571
Patented Mar. 20, 1973

3,721,571
PUDDING COMPOSITIONS
Martin Glicksman, 229 Valley Road, Valley Cottage, N.Y. 10989, and Elizabeth H. Farkas, 377 N. Broadway, Yonkers, N.Y. 10701
No Drawing. Filed Jan. 14, 1971, Ser. No. 106,583
Int. Cl. A23l 1/14, 1/04
U.S. Cl. 99—139
4 Claims

ABSTRACT OF THE DISCLOSURE

Room-temperature setting dessert compositions which exhibit good resistance to syneresis, even under conditions of high temperature heat treatment or freeze-thaw, are prepared from non-chemically modified starch and xanthan gum either alone or in combination with locust bean gum and/or tara gum.

BACKGROUND OF THE INVENTION

Conventional starch-containing puddings oftentimes have a pasty and heavy consistency and are highly susceptible to liquid separation or syneresis on aging. The problem of syneresis becomes especially apparent when starch puddings have been heat treated in order to make them shelf-stable or when the puddings have been subjected to freeze-thaw conditions.

Many previous attempts have been made to stabilize these starch-containing puddings against syneresis by the use of chemically modified food starches. The use of these chemically modified starches is, however, subject to strict governmental control and it would be preferred to attain a comparable resistance to syneresis solely by means of non-chemically modified materials.

It has been disclosed in U.S. Pat. No. 3,507,664 to Schuppner that a pudding composition (Example 1) which exhibits a relatively high resistance to syneresis on aging can be produced containing a natural gelling system and potassium and calcium metal salts. The presence of these metal salts, however, has a deleterious effect on the taste of the pudding. It has also been found that these compositions of Schuppner are not resistant to syneresis and break down upon being frozen and thawed.

SUMMARY OF THE INVENTION

According to this invention a starch pudding composition, which has a high resistance to syneresis especially during heat treatment and during freeze-thaw conditions, is prepared from naturally occurring materials including non-chemically modified starch, milk or milk solids and gums, without requiring the presence of any metal salts. The gums which have proven successful in this invention are xanthan gum and combinations of xanthan gum and locust bean gum and xanthan gum and tara gum. Non-chemically modified starches may be either raw starches or physically modified starches (e.g. pregelatinized).

It is contemplated that the pudding compositions of this invention may be fully prepared puddings such as canned or frozen puddings or the instant-type puddings such as those prepared from powdered mixes with the addition of either milk or water.

It is an object of this invention to provide a starch-containing pudding which has a high resistance to syneresis upon heat treatment and/or freeze-thaw conditions.

It is an additional object of this invention to produce a starch-containing pudding which contains neither chemically modified starches nor metal salts.

It is a further object of this invention to produce dry pudding mixes which will form a pudding when added either to milk or to water.

DESCRIPTION OF THE INVENTION

Broadly this invention comprises a quick-setting syneresis-resistant pudding composition containing a non-chemically modified food starch, sweetening agents, fat emulsion, gum, color and flavor additives, milk or water and milk solids. These pudding compositions may be fully prepared and distributed to the consumer as a shelf-stable product, (e.g. canned), a refrigerated product or a frozen product. Alternatively it is also possible to distribute a dry mix to the consumer who would then add milk or water to the mix in order to produce the pudding composition.

Exemplary of the non-chemically modified food starches which may be employed in accordance with the present invention are corn starch, potato starch, tapioca starch, rice starch and wheat starch. Of these vegetable starches, tapioca starch has been found to be the preferred starch because it appears to produce puddings having the greatest resistance to syneresis. However, other starches both raw and pregelatinized also produce satisfactory products.

Sweetening agents which may be included in the pudding composition include sucrose, dextrose, lactose, fructose, dextrins and similar carbohydrates. Low calorie puddings may also be prepared by employing synthetic sweetening agents preferably in combination with a low bulk density carbohydrate filler.

Fat emulsions may be added to the pudding compositions to improve the textural quality of the pudding. These fat emulsions usually containing a vegetable fat may be added directly to the pudding composition during the preparation of a prepared pudding. Alternatively the fat emulsion may be any one of the spray dried, non-dairy emulsions such as those commercially available for use as cream substitutes. The dry fat emulsions are particularly adapted for use in the preparation of the dry pudding mixes of this invention.

A critical element of this invention is the use of a particular type of gum known as xanthan gum. Xanthan gum may be used either alone or in combination with locust bean gum and/or tara gum. Tara gum is a vegetable gum imported from Peru and is derived from the legume seed, *Cesalpinia spinosa*.

The xanthan gums which may be employed in this invention are typically illustrated by the Xanthomonas colloid produced by the bacterium *Xanthomonas campestris*. A suitable xanthan gum is available under the name Keltrol from Kelco Co.

When xanthan gum is used in combination with locust bean gum and/or with tara gum, the ratio of xanthan gum to the other gums should be in the range of about 3 parts xanthan to 1 part of the other gums to about 1 part xanthan to 3 parts of the other gums. The preferred combination however, is about equal parts of xanthan gum and locust bean or tara gum.

As an additional feature of this invention it has been found that the gel systems and dessert compositions of this invention are resistant to acid degradation even under conditions of prolonged heating. This feature will enable the teachings of this invention to be employed in the formation of a variety of acid-flavored dessert gels.

Typical compositions for the prepared puddings of this invention may be defined by the following percent weight ranges:

Water _____ 45–80
Carbohydrates _____ 10–20
Fat emulsion _____ 5–15
Milk solids _____ 3–10
Non-chemically modified starch _____ 2–10
Xanthan gum _____ .08–1
Flavor/color _____ As desired

| Ingredient | Amount |
|---|---|
| Water | 45–80 |
| Carbohydrates | 10–20 |
| Fat emulsion | 5–15 |
| Milk solids | 3–10 |
| Non-chemically modified starch | 2–10 |
| Xanthan gum | .04–0.5 |
| Locust bean and/or tara gum | .04–0.5 |
| Flavor/color | As desired |

Typical compositions for the powdered pudding mixes of this invention which are adapted to be added to either milk or water are defined by the following percent weight ranges:

| Ingredient | Amount |
|---|---|
| Carbohydrates | 35–60 |
| Dried fat emulsion | 25–50 |
| Non-chemically modified starch | 5–12 |
| Xanthan gum | 0.4–2 |
| Dry milk solids | 0–20 |
| Color/flavor | As desired |

| Ingredient | Amount |
|---|---|
| Carbohydrates | 35–60 |
| Dried fat emulsion | 25–50 |
| Non-chemically modified starch | 5–12 |
| Xanthan gum | 0.1–1 |
| Locust bean and/or tara gum | 0.1–1 |
| Dry milk solids | 0–20 |
| Color/flavor | As desired |

The invention is further described, but not limited to the following examples:

EXAMPLE 1

| Ingredient | Grams |
|---|---|
| Water | 660 |
| Sucrose | 118 |
| Fat emulsion | 90 |
| Non-fat milk solids | 50 |
| Raw tapioca starch | 48 |
| Xanthan gum | 0.6 |
| Locust bean gum | 0.6 |
| Flavor/color | As desired |

EXAMPLE 2

| Ingredient | Grams |
|---|---|
| Water | 670 |
| Sucrose | 197 |
| Fat emulsion | 66 |
| Non-fat milk solids | 64 |
| Raw corn starch | 40 |
| Xanthan gum | 1.0 |
| Flavor/color | As desired |

Each of the above compositions is prepared by forming a liquid fat emulsion by melting together a fat and an emulsifier, combining the dry ingredients and dispersing them in the water component which is then brought to a full boil, adding the liquid fat emulsion to the water phase and blending until uniform. The compositions are then homogenized and allowed to set for 15 minutes to produce puddings having a smooth creamy texture. Samples of each of these puddings were separately packaged and stored in the following manners: (1) the pudding was sealed in a metal can, autoclaved at 200° F. for 30 minutes and stored at ambient conditions for 6 weeks, (2) the pudding was packaged in a plastic container and refrigerated at 40° F. for three weeks, and (3) the pudding was packaged in a plastic container, placed in a freezer at 0° F. for 6 weeks and then thawed. In every instance the puddings retained their smooth creamy texture and were substantially free from the effects of syneresis.

EXAMPLE 3

| Ingredient | Grams |
|---|---|
| Sugar (confectioners 10×) | 52.0 |
| Spray dried fat emulsion | 40.0 |
| Pregelatinized tapioca starch | 10.0 |
| Xanthan gum (Keltrol) | 1.0 |
| Locust bean gum | 1.0 |
| Vanilla flavor | 1.5 |
| Vanilla color | 0.3 |

The above dry mix was added to one cup (240 ml.) cold milk and mixed for 2 minutes at high speed in a conventional household mixer. The product had an overrun of 68% and set to a pudding gel within about 30 minutes at room temperature. The pudding had a soft, creamy, glossy texture upon gelling and was able to be frozen overnight and then thawed without showing any signs of syneresis or other textural breakdown.

The addition of 0.5 gram of tetrasodium phosphate to the formulation of Example 3 enabled the pudding to gel within about 15 minutes at room temperature, but as can be seen phosphates are not necessary in this system.

EXAMPLE 4

| Ingredient | Grams |
|---|---|
| Sugar (confectioners 10×) | 52.0 |
| Spray dried fat emulsion | 40.0 |
| Pregelatinized tapioca starch | 10.0 |
| Xanthan gum (Keltrol) | 1.0 |
| Tara gum | 1.0 |
| Dry milk solids | 25.0 |
| Vanilla flavor | 1.5 |
| Vanilla color | 0.3 |

The above dry mix was added to one cup of cold water and mixed for 2 minutes at high speeds. The product had an overrun of 80% and set to a pudding gel rapidly at room temperature. The pudding had a texture comparable to that of Example 3 and was likewise able to be frozen and thawed without showing any signs of syneresis or other textural breakdown.

It will be apparent that there are variations and modifications of this invention and that the preferred proportions and ingredients may be varied without departing fom the scope of the invention.

Having thus described the invention what is claimed is:

1. A pudding composition substantially free of phosphate salts which exhibits resistance to syneresis under conditions of freeze-thawing or high temperature heat treatment, comprising on a weight basis: water 45% to 80%, sweetening agents 10% to 20%, fat emulsion 5% to 15%, milk solids 3% to 10%, non-chemically modified starch 2% to 10% and gums selected from the group consisting of:
    (a) xanthan gum 0.08% to 1%;
    (b) xanthan gum 0.04% to 0.5% and locust bean gum 0.04% to 0.5%;
    (c) xanthan gum 0.04% to .5% and tara gum 0.04% to 0.5%; and
    (d) xanthan gum 0.04% to 0.5% and a combination of locust bean gum and tara gum 0.04% to 0.5%.

2. A frozen pudding composition in accordance with claim 1.

3. A canned, shelf-stable pudding composition in accordance with claim 1.

4. A pudding composition according to claim 1 wherein the starch is tapioca starch.

References Cited

UNITED STATES PATENTS

| | | | |
|---|---|---|---|
| 3,507,664 | 4/1970 | Schuppner | 99—139 |
| 2,901,355 | 8/1959 | Bangert et al. | 99—139 |
| 3,067,038 | 12/1962 | O'Connell | 99—144 |
| 3,557,016 | 1/1971 | Schuppner | 99—139 |

ALVIN E. TANENHOLTZ, Primary Examiner

J. M. HUNTER, Assistant Examiner